Figure 1:
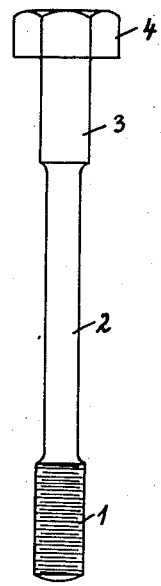

Nov. 10, 1936.          W. T. SCHAURTE ET AL          2,060,593
METAL ELEMENT AND METHOD OF MAKING THE SAME
Filed April 25, 1935

INVENTORS
WERNER T. SCHAURTE
By AUGUST THUM
ATTORNEYS.

Patented Nov. 10, 1936

2,060,593

UNITED STATES PATENT OFFICE 2,060,593

METAL ELEMENT AND METHOD OF MAKING THE SAME

Werner T. Schaurte, Neuss-on-the-Rhine, and August Thum, Darmstadt, Germany, assignors to Bauer & Schaurte, Rheinische Schrauben u. Mutternfabrik A. G., Neuss-on-the-Rhine, Germany, a corporation of Germany Application April 25, 1935, Serial No. 18,084
In Germany April 25, 1934

5 Claims. (Cl. 10—27)

The invention relates to metal elements of homogeneous material and more particularly to metal elements designed for use as machine parts and having portions of various cross-sectional dimensions. In modern machines, motors and the like, individual elements, in addition to the static stress to which they are subjected, are subjected to additional stresses which are very high when compared with the fatigue strength of said elements, these additional stresses being developed as the result of repeated blows, shocks, vibration and the like. In many instances the problem thus arises to produce metal elements constituting machine parts which have a sufficient fatigue strength to efficiently meet these additional stresses. It has been attempted to increase the fatigue strength of metal elements such as machine parts which in practice are subject to additional stresses of the type referred to hereinbefore, by giving to a predetermined portion of the element, for example the shank of a bolt, a relatively reduced cross section to minimize the concentration of stresses that leads to fatigue fracture in the threaded portion of the bolt. In such cases the stresses are taken up by the smooth-surfaced shank which is more fatigue-resisting than the notched surface of the threaded portion of the bolt. This construction has proved successful particularly with threaded elements in which, as is known, fatigue fractures occur invariably in the threaded portion on account of the increased stress occurring at the roots of the threads. If the shank of the bolt is made of reduced section, the shank, which is provided with a smooth surface, carries the load without injury.

It is however well recognized, particularly with respect to threaded elements, that the danger of fatigue fracture is lower, the higher the initial static stress or load of the threaded portion. Only if during operation of the machine the initial load given during assembly is reduced, do the conditions conducive to fatigue fracture arise. In order to make it possible to give to the element such a high initial load it is necessary for the element to have a correspondingly high static tenacity, so that the static stress does not exceed the elastic limit. However, especially with bolts, it is particularly difficult to prevent the elastic limit from being exceeded during assembly, since the fitter tightens the bolts by hand, depending on his sense of touch. The elastic limit should however in no case be exceeded in structural elements, since undesirable permanent deformations may be caused thereby. This danger obviously exists to a high degree with bolts, the shanks of which are reduced in diameter for the purpose of increasing the fatigue strength thereof.

The object of the invention is to provide a metal element and more particularly a machine part possessing strength properties which enable said element in all of its portions to take up the same static or initial load. The invention contemplates further the provision of novel methods whereby such metal elements or machine parts may be efficiently produced and whereby previously existing disadvantages are overcome and avoided. Other more specific objects will appear from the description hereinafter and the features of novelty will be pointed out in the claims.

Figure 2:
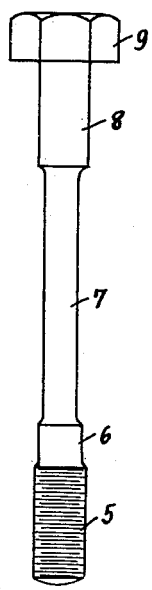
Figure 3:
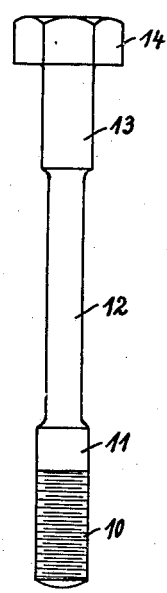
Figure 4:
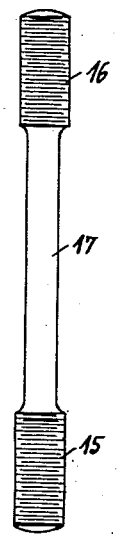
Figure 5:
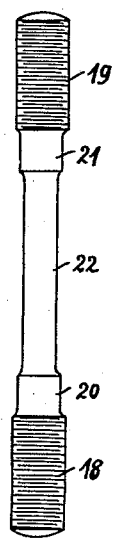
Figure 6:
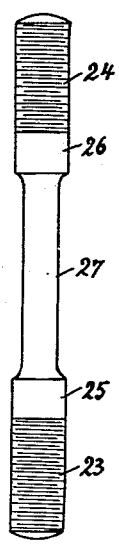

In the accompanying drawing, which illustrates examples of the metal elements under discussion without defining the limits of the invention, Figs. 1, 2, and 3 are views showing three different forms of machine screws, and Figs. 4, 5, and 6 are views illustrating three different types of bolts threaded at their opposite ends.

According to the present invention, with a machine part which has various cross sectional dimensions, for example an element which has portions of reduced section for the purpose of increasing its fatigue strength, the portion of reduced cross section is to have greater strength per unit of cross-sectional area than the portion of larger cross section. In this way complete utilization of the material is attained, and a fitter is not so apt to rely on the thicker portions of the element and to submit the latter to loads which the thinner portions are not adapted to carry. A machine part having the properties aimed at by the present invention can be attained by employing different producing processes for the individual portions coincidentally with the shaping of the article, which processes impart different tenacities to the material in these portions, or by imparting to the individual portions of the article, after its shaping is complete, the desired strength properties by means of a supplementary or subsequent treatment. It is also possible to combine these two methods of procedure.

The machine screws and screw bolts shown in the drawing for the sole purpose of exemplifying the metal elements or machine parts to the production of which the novel method is especially applicable, all have a reduced shank portion with corresponding reduced cross section. The reduced shank in all cases has a diameter which is smaller than the inside diameter of the associated threads.

Figs. 1–3 show headed screws, and Figs. 4–6 illustrate bolts with threads at each end. In Fig. 1 the shank is reduced at the portion 2 and at its one end connects directly with the threaded portion 1, the inside diameter of which is larger than the diameter of the reduced shank 2; at its other end the reduced shank 2 is connected with the shank section 3 which is not reduced and which carries the head 4.

Fig. 2 corresponds to Fig. 1 with the exception that a section 6 which is not reduced and has a diameter corresponding approximately to the inside diameter of the threaded portion 5, is located between the latter and the reduced portion 7 of said shank. The reduced portion 7 is connected with a shank section 8 which is not reduced and which carries the head 9.

In the form shown in Fig. 3, the reduced portion 12 of the shank is located between two sections 11 and 13 which are not reduced and which have a diameter corresponding to the outside diameter of the threaded portion 10; the section 13 carries the head 14.

Fig. 4 shows a screw bolt in which the entire shank 17 is reduced to a diameter less than the diameters of the threaded end portions 15 and 16.

Fig. 5 illustrates a screw bolt which includes sections 20 and 21 at opposite ends of the reduced shank portion 22 and having diameters corresponding approximately to the inside diameters of the threaded portions 18 and 19.

In Fig. 6 the screw bolt is provided at opposite ends of the reduced shank portion 27 with sections 25 and 26 having diameters corresponding to the outside diameters of the threaded portions 23 and 24.

Bolts provided with shanks of relatively reduced cross-sectional dimensions for the purpose of increasing the fatigue strength thereof have previously been made by operations customarily used in machine-tool shops, as for example turning or milling. It has heretofore been proposed in this connection to raise the fatigue strength of the threaded part of such bolts by cold rolling the thread or cold finishing the thread after it has been aprtly formed by a cutting operation. In the production of such bolts, however, consideration has never been given to the fact that the shank which has been reduced to comparative thinness should have a high initial stress for the purpose of effectively increasing the fatigue strength of the bolt, but which shank as a consequence of its small cross section is not adapted to take up static loads, including initial stresses, to the same extent that the stronger threaded portion or portions of the bolt can efficiently withstand such loads. As a result the reduced shank either suffered a fatigue fracture, or was overstressed in assembly. Full utilization of the material in all of its parts and adaptation of the qualities of the material to the stresses to be carried so that every section possesses the same load-carrying capacity, have previously been neither sought nor attained.

For the production of a bolt according to the present invention the reduced shank portions or shanks 2, 7, 12, 17, 22, and 27 or their equivalent, may be conveniently formed by cold working, whereby said reduced shank portions or shanks receive, as is known, an increased tenacity; in other words, different tenacities may be imparted to the individual portions of the bolt coincidentally with the shaping thereof. The shanks 2, 7, 12, 17, 22, and 27, or their equivalent, may, however, be formed by a process of any desired kind, for example by turning, and then be submitted to a heat treatment after the shaping is finished; that is to say the bolts may first be shaped to produce therein portions having various cross-sectional dimensions and subsequently treated to impart strength properties to the individual portions thereof to enable the bolts in all of their portions to take up substantially the same static load. For instance the shank portions or shanks 2, 7, 12, 17, 22, and 27 or their equivalent may be case-hardened by the ordinary high temperature process, or treated by the nitrogen process subsequently to the shaping of the bolts. Turning and cold working may be combined by first machining the shank portions or shanks to nearly their finished diameters, and thereafter imparting to said shank portions or shank the ultimate cross-sectional forms by cold rolling or drawing.

An advantageous process for the production of a bolt of increased fatigue strength and of substantially equal load-carrying capacity in all cross sections according to the invention consists according to the foregoing in, for instance, partly or wholly cold rolling the threaded portions 1, 5, and 10, or the threaded portions 15 and 16, 18 and 19, and 23 and 24, and producing the shank portions or shanks 2, 7, 12, 17, 22, and 27 or their equivalent of relatively reduced diameter wholly or partly by cold working. In addition, the bolts or other elements may be subjected, after the forming operation has been completed, to heat treatment between 400 and 500 deg. C. It has been found that the heat treatment at this temperature range with the employment of certain materials, particularly with low-carbon steel, that is steel containing for instance from 0.06 to 0.15 percent of carbon, on the one hand allows the harmful stresses due to cold working to be eliminated, and on the other hand is low enough to reduce only slightly the high static tenacity attained by the cold working, and to ensure a high actual elastic limit.

While the drawing illustrates the invention as applied to machine screws and bolts and while the specification refers to these machine screws and bolts in describing the invention, it is to be distinctly understood that this in no sense defines the limits of the invention which obviously may be used with equal efficiency in the production of machine parts and equivalent elements of other types.

Various changes in the specific forms of the machine part, as exemplified by the illustrated machine screws and bolts, and in the methods of producing the same and equivalent metal elements, may be made within the scope of the claims without departing from the spirit of the invention.

We claim:

1. A homogeneous metal element having a reduced portion which serves to increase the fatigue strength of the element, and as a whole having different tenacities in correspondence with the cross-sectional dimensions of the individual portions for the purpose of developing strength properties in said element which enable said element in all of said portions to take up substantially the same initial load without overstraining.

2. A machine element of homogeneous material having adjacent cylindrical portions of relatively different cross-sectional dimensions whereby the fatigue strength of the element is increased, and as a whole having different tenacities in correspondence with the cross-sectional dimensions of the individual portions for the purpose of developing strength properties in said element which enable said element in all of said cylindrical portions to take up substantially the same initial load without overstraining.

3. The method of producing a homogeneous metal element having a reduced portion which serves to increase the fatigue strength of the element, consisting in shaping said element to produce therein portions having various cross-sectional dimensions and as a consequence of the processes by which said portions are shaped, imparting different tenacities to the individual portions of said element in correspondence with their cross-sectional dimensions for the purposes of developing strength properties in said element which enable both the reduced and the unreduced portions thereof to take up substantially the same initial load without overstraining.

4. The method of producing a homogeneous metal element having a reduced portion which serves to increase the fatigue strength of the element, consisting in shaping said element to produce therein portions having various cross-sectional dimensions and subsequently treating said element to impart different tenacities to the individual portions of said element in correspondence with their cross-sectional dimensions for the purpose of developing strength properties in said element which enable both the reduced and the unreduced portions of said element to take up substantially the same initial load without overstraining.

5. The method of producing a homogeneous metal element having a reduced portion which serves to increase the fatigue strength of the element, consisting in shaping said element to produce therein portions having various cross-sectional dimensions and partly by treatment coincidental with said shaping and partly by treatment subsequent to said shaping, imparting different tenacities to the individual portions of said element in correspondence with their cross-sectional dimensions for the purpose of developing strength properties in said element which enable both the reduced and the unreduced portions of said element to take up substantially the same initial load without overstraining.

WERNER T. SCHAURTE.
AUGUST THUM.